April 21, 1970 W. E. DESMARCHAIS 3,507,528
LOCKING DEVICE
Original Filed Aug. 18, 1961 4 Sheets-Sheet 1

INVENTOR
Walter E. Desmarchais
BY
ATTORNEY

United States Patent Office 3,507,528
Patented Apr. 21, 1970

3,507,528
LOCKING DEVICE
Walter E. Desmarchais, Penn Hills Township, Pittsburgh, Pa., assignor to Westinghouse Electric Corporation, Pittsburgh, Pa., a corporation of Pennsylvania
Continuation of application Ser. No. 132,424, Aug. 18, 1961. This application Feb. 16, 1965, Ser. No. 435,406
Int. Cl. F16b 7/00
U.S. Cl. 287—124             11 Claims

ABSTRACT OF THE DISCLOSURE

A locking mechanism is provided for locking and releasing a pair of members locked together at adjacent inner ends. The locking mechanism is formed with a movable intermediate member having one operative position to lock the members together and a second position for permitting release. Means are provided adjacent the outer end of one of the members and exposed to the outer end thereof for fixedly positioning the intermediate member in its one position and for permitting movement of the latter member to its second position.

---

This application is a continuation of applicant's co-pending co-assigned application, Ser. No. 132,424 entitled "Locking Device" and filed Aug. 18, 1961 and now abandoned.

The present invention relates to a locking device for a linearly actuated latching mechanism and more particularly to a positive locking device which prevents an inadvertent uncoupling of a control rod from the latching mechanism normally provided at the end of its drive shaft in a nuclear reactor.

As this description proceeds, it will be apparent that the aforesaid positive locking device, as disclosed herein, will be readily adaptable to general usage. In this application, however, the locking mechanism of the invention is described in connection with the latching mechanism usually employed as part of the driving mechanism for the control rods of a nuclear reactor, particularly of the pressurized water type.

In the latter reactor, a core structure is frequently supported within a body of circulating coolant water. The core structure comprises a plurality of elongated fuel elements suspended in parallel fashion therein and a number of control rods suitably shaped to be inserted between selected groups of fuel elements. The fuel elements frequently comprise at least a portion of a fissionable isotope such as $U^{233}$, $U^{235}$ or $Pu^{239}$ in which a controlled chain reaction is initiated, in a well known manner, by atomic reaction thereof with thermal neutrons. The chain reaction is controlled or terminated by adjustment of the aforesaid control rods, which are composed at least in part of thermal neutronic absorbing material, such as cadmium, boron, cobalt or their alloys.

To minimize hazards in replacing or rearranging the aforesaid fuel elements, it is desirable that the control rods remain in their scrammed or fully inserted positions within the reactor core. Therefore, it has been necessary to disengage or unlatch the control rods from their associated drive shafts in order to withdraw the fuel elements suspended in the reactor core. To accomplish this, the present drive shaft design incorporates a disconnect rod with a disconnect button at its upper end and outside of the reactor vessel. The disconnect rod extends longitudinally through the center of the drive shaft to a coupling or latching unit fixed to the lower end of the drive shaft; and the coupling unit, in turn, is connected to the control rod. To disengage the coupling unit from the control rod, it is merely necessary to exert an upward pull on the disconnect button. During operation a mishap can occur which causes the disconnect button to be forced upwardly thereby unlatching the coupling unit from the control rod. If such a mishap should occur with the control rod in a partially or fully withdrawn position, the control rod would fall freely until it reached its fully inserted position at which point it would come to a sudden stop against a stop member usually provided therefor in the lower regions of the reactor vessel. Such a sudden stop can easily damage a control rod which may weight approximately 500 pounds. The control rod can also buckle under the force of the impact and become wedged among or against neighboring fuel elements, thus creating severe removal problems caused by the attendant radiation from a reactor which has been in normal operation.

Accordingly, it is the general object of this invention to provide a novel locking mechanism.

Another object of the invention is the provision of a novel locking arrangement adapted for use with a linearly movable coupling or latching arrangement.

It is a more particular object of this invention to provide a positive locking device which will prevent the inadvertent unlatching of a control rod from its associated drive shaft in a nuclear reactor.

Still another object of this invention is to unlatch the control rod by performing two or more separate operations so as to prevent the inadvertent unlatching of the control rod from its associated drive shaft.

Briefly, the present invention accomplishes the above cited objects by incorporating a locking mechanism built into or associated with a linear drive shaft; and in this application the locking mechanism is built into a disconnect button located at the upper end of a disconnect rod. The disconnect rod extends longitudinally through the center of the drive shaft to a coupling or latching arrangement. A coupling unit, in turn, is fixed to the lower end of the drive shaft and connects a driven member or control rod to the drive shaft. The coupling unit cannot be unlatched from the control rod unless the disconnect rod is lifted. The positive locking mechanism built into the disconnect button comprises a spring operated push rod and a plurality of movable retaining members. The disconnect button is firmly locked to the drive shaft by the retaining members which are partially forced into a groove or indent in the drive shaft while the remaining portion of each member remains in an opening in a sleeve structure fixed to the disconnect button. The coupling unit is unlatched from the control rod by depressing the push rod and then lifting the disconnect button while the push rod remains depressed. This permits the retaining members to move out of the indent in the drive shaft, unlocks the drive shaft from the disconnect button, and allows the disconnect button to be lifted together with the disconnect rod which is fixed to the disconnect button. Lifting of the disconnect rod, in turn, permits the coupling unit to be unlatched from the control rod. Thus, two discrete motions are required to unlatch the coupling unit from the control rod; namely, depressing the push rod and then lifting the disconnect button while the push rod remains depressed.

Further objects and advantages of the invention become apparent as the following description proceeds, and features of novelty which characterize the invention will be pointed out in particularity in the claims annexed to and forming a part of this specification.

For a better understanding of the invention, reference may be had to the accompanying drawings, in which:

FIGURES 1A, 1B, and 1C constitute a tripartite, longitudinal, sectional view of the positive locking mechanism of the invention, a coupling unit, and the intervening parts connecting the locking mechanism to the coupling unit in accordance with the teachings of the invention;

Figure 1A:
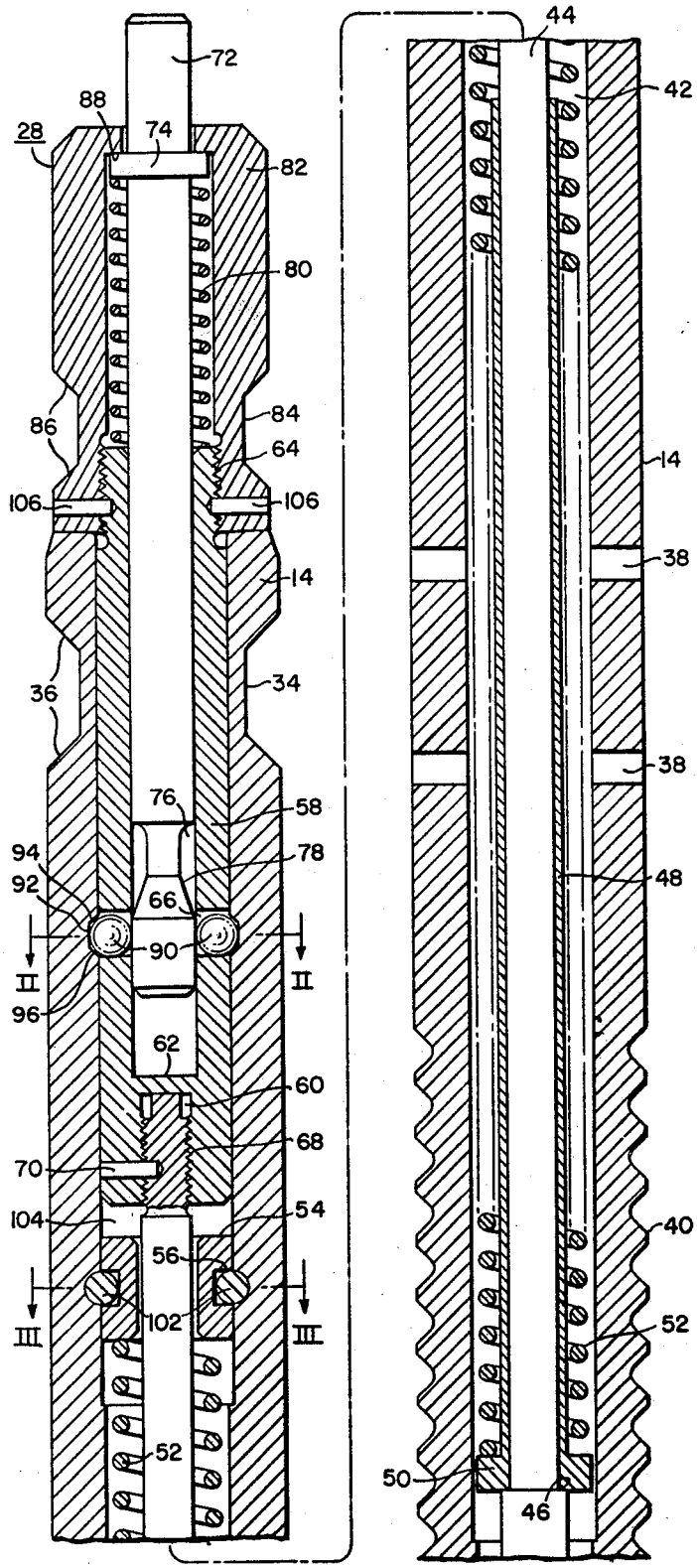
Figure 2:
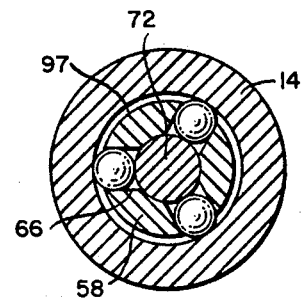
FIG. 2 is a cross sectional view taken along reference line II—II of FIG. 1A and showing the retaining members forced into a groove in the drive shaft.
Figure 1B:
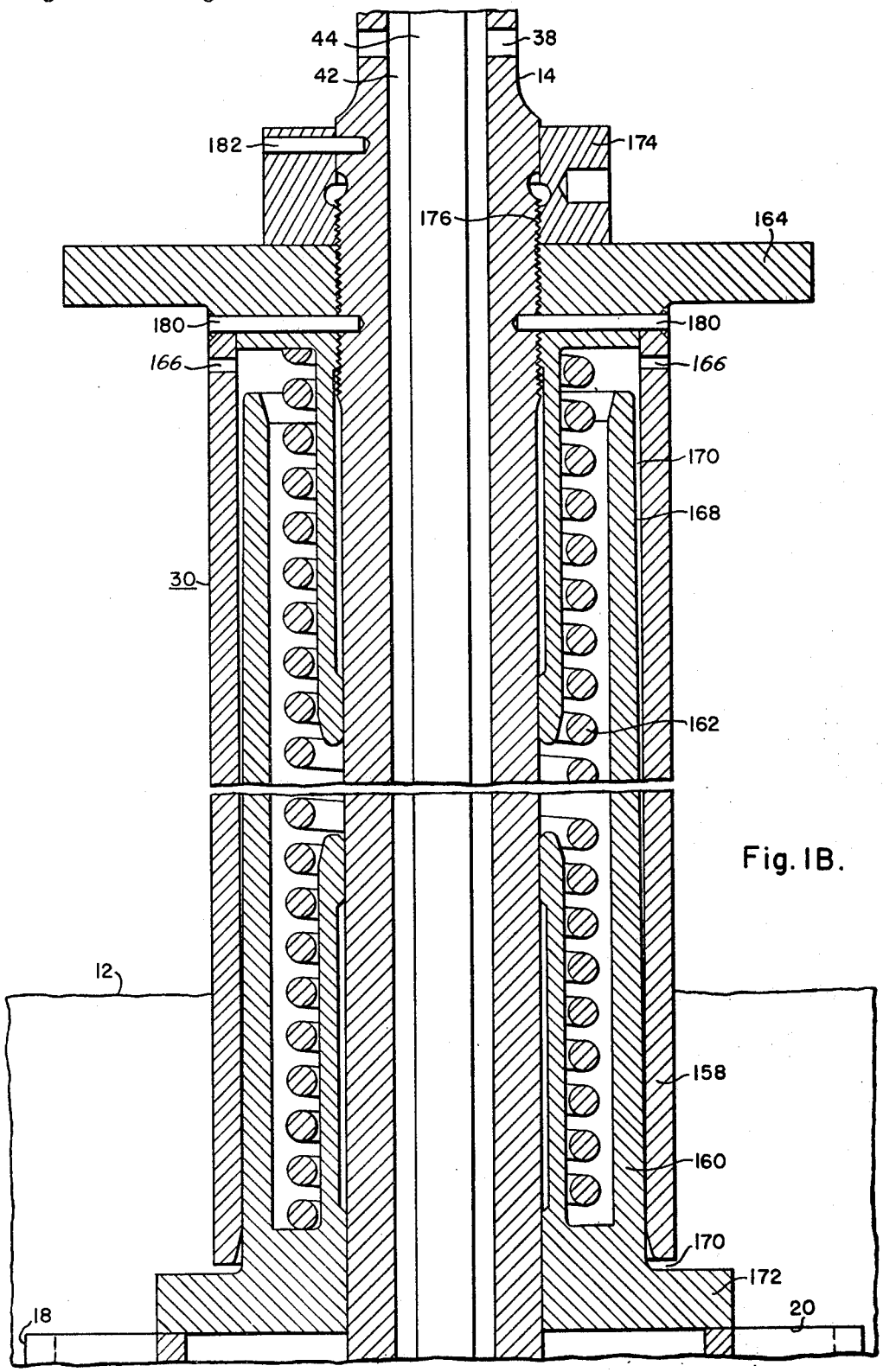
Figure 1C:
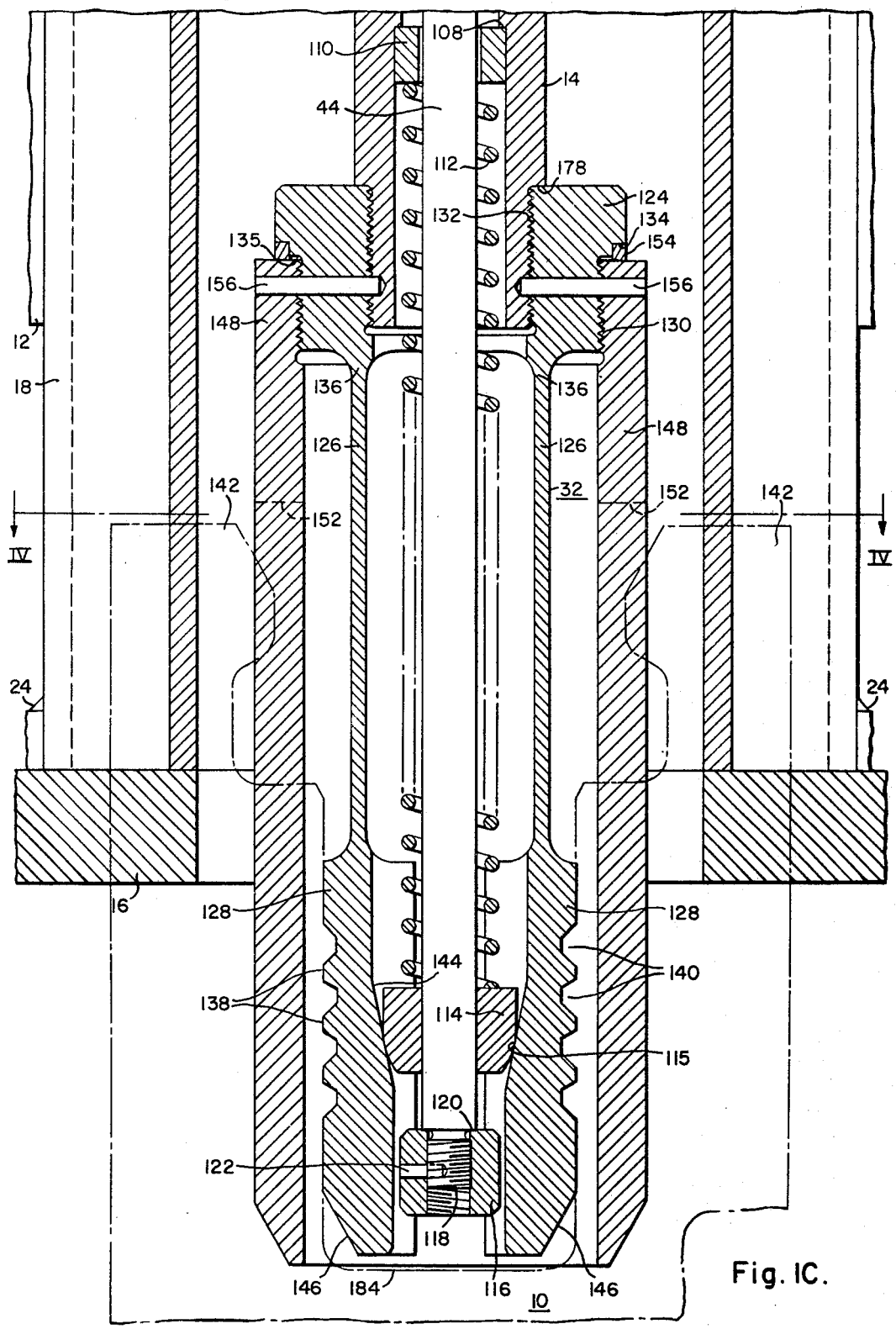

Referring to FIGS. 1 to 4 of the drawings, and more particularly to FIGS. 1A, 1B, and 1C, the exemplary form of the invention shown therein is adapted for use, in this example, with a driven member or control rod 10 having an offset, cruciform cross-section, which is supported for movement within a shroud tube 12 of a generally tubular cross-section by a generally tubular support or control rod drive shaft 14.

Figure 4:
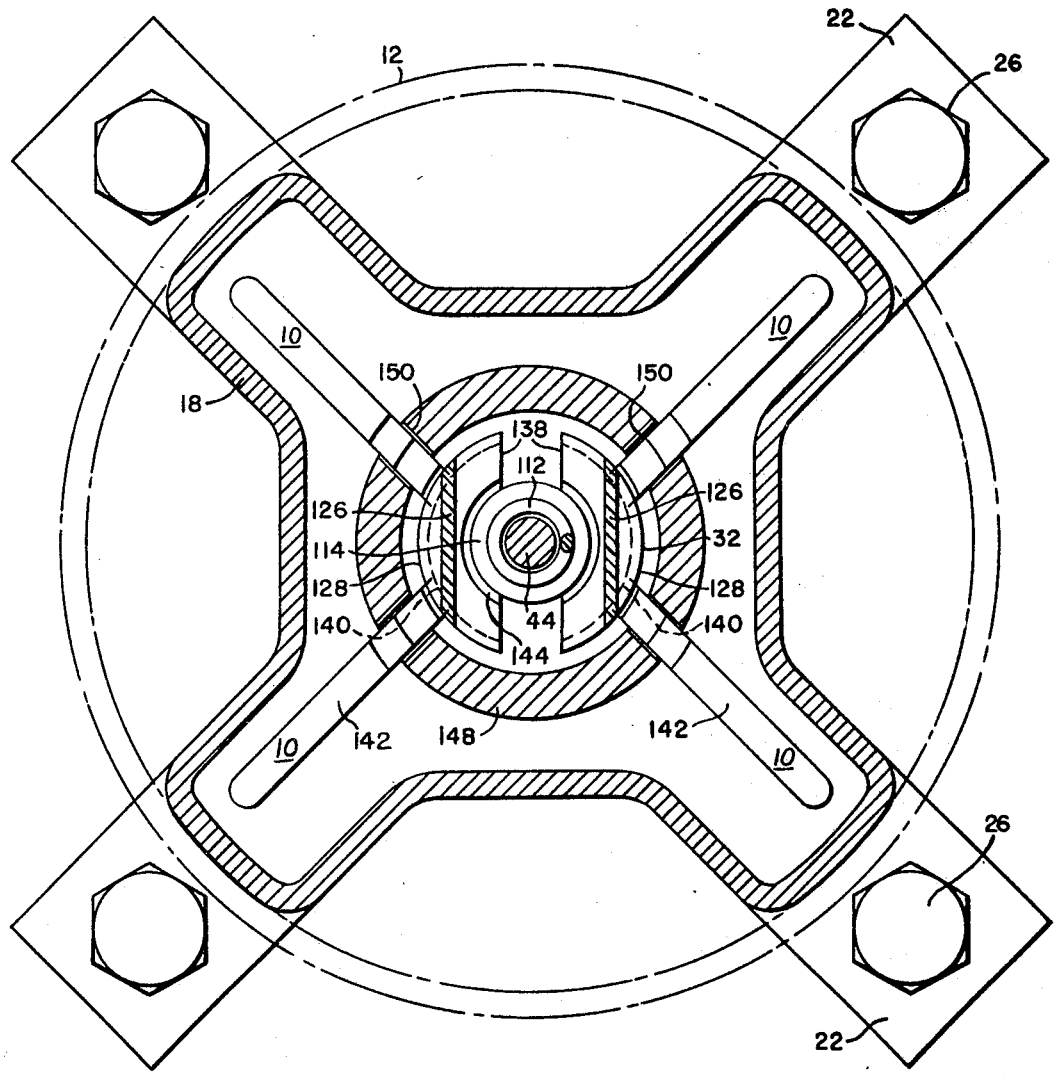
FIG. 4 is a cross sectional view taken along reference line IV—IV of FIG. 1C and shows a cross-section through the upper part of the coupling unit.

For the purpose of this specification, the terms "tubular, tubularly shaped, and tubular member" are definitive not only of a pipe-like structure having a cross section defined by two concentric circles but are also specifically intended to include structures having other cross sectional shapes. In their broad aspects, the aforementioned terms include any member or structure having an opening extending longitudinally through at least a portion thereof. The shroud tube 12 extends upwardly into the upper region of the reactor and is supported by an upper shroud tube supporting plate (not shown). The shroud tube 12 extends downwardly to a point a short distance above an upper core supporting plate 16 and also slidably overlaps a dashpot stop 18 having a generally cruciform shape and through which the control rod 10 passes. The dashpot stop 18 extends upwardly for a relatively short distance above the upper core supporting plate 16 as indicated by the reference character 20 (FIG. 1B) and is secured to the top of the upper core supporting plate 16. For this purpose four generally rectangularly shaped plates 22 are secured to the lower portion of the dashpot stop 18 by weld 24. The dashpot stop plates 22 are, in turn, bolted to the upper core supporting plate 16 by bolts 26 (FIG. 4).

FIGS. 1A, 1B, and 1C of the drawings show the drive shaft 14 and its related components coupled to the control rod 10, which is in its scrammed or fully inserted position within the reactor core (not shown). The components, to be described hereinafter and related to the drive shaft 14, comprise a locking mechanism 28 located at the top of the drive shaft 14, a dashpot 30 extending over the lower portion of the drive shaft 14, and a coupling unit 32 permanently affixed to the lower end of the drive shaft 14 and coupled to the control rod 10.

A known form of control rod drive mechanism (not shown), which drives the associated drive shaft 14, is located above and external to the reactor vessel in a vertical position. The drive shaft 14 extends vertically upwardly from the top of the coupling unit 32 through a central opening in the control rod drive mechanism. A notch 34 is formed on the outer periphery of the drive shaft 14 and is located in the upper portion of the drive shaft 14. The drive shaft notch 34 has camming surfaces 36 formed at its upper and lower ends, which are required in conjunction with a remote handling tool (not shown) used in the removal of the drive shaft 14. A plurality of radial apertures 38, formed in the drive shaft 14, are spaced longitudinally along the drive shaft 14 to permit the escape of water within the drive shaft 14 during a scram operation. A toothed portion 40, formed on the outer periphery of the drive shaft 14, extends longitudinally from the upper portion of the reactor vessel (not shown) to the top of the control rod drive mechanism (not shown) and is engaged by the control rod drive mechanism during withdrawal or insertion of the control rod 10. The tubularly shaped drive shaft 14 has a longitudinal opening 42 extending throughout its entire length.

A disconnect rod or intermediate member 44, which extends from the lower end of the locking mechanism 28 to the lower end of the coupling unit 32 has a shoulder 46 at a location from the top of the disconnect rod 44 approximately one-fourth of the entire length of the disconnect rod 44. Prior to insertion of the disconnect rod 44 through the drive shaft 14, a sleeve 48 having a collar 50 is slidably placed over the top of the disconnect rod 44 and lowered until the collar 50 engages the shoulder 46. The sleeve 48 extends upwardly from the collar 50 for a purpose to be described hereinafter. A rod spring 52 is then slidably placed over the disconnect rod 44 and the disconnect rod sleeve 48 and against the collar 50. A tubularly shaped top spring retainer 54 is then slidably placed over the top of the disconnect rod 44 and bears against the top of the rod spring 52. An annular groove 56 is also formed on the outer periphery of the top spring retainer 54.

LOCKING MECHANISM

A sleeve or ball cage 58, which is substantially tubular throughout its entire length, has a longitudinally threaded opening 60 at its lower end and a solid transverse partition 62 directly above the threaded opening 60. The remainder of the ball cage 58 above the partition 62 is tubular in shape and has an external threaded portion 64 at the upper end. A short distance above the partition 62 the ball cage 58 has a plurality of radial openings 66 in the same horizontal plane. In this example of the invention, there are three such radial openings 66 in the ball cage 58. The ball cage 58 is then threaded onto the disconnect rod 44, which has a threaded upper portion, as indicated by reference number 68, until the top of the disconnect rod 44 contacts the bottom of the partition 62. The ball cage 58 is then locked to the disconnect rod 44 by a lock pin 70, which is inserted transversely through the ball cage 58 and substantially into the disconnect rod 44. The disconnect rod 44 and its related, previously assembled parts are slidably inserted into the top of the drive shaft 14 as far as the radial openings 66 in the ball cage 58.

Figure 3:
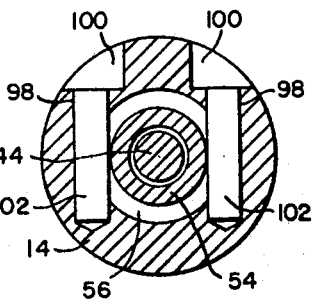
FIG. 3 is a cross sectional view taken along reference line III—III of FIG. 1A and shows how the top spring retainer is affixed to the drive shaft.

A short distance below the top of a locking member or push rod 72 is formed a collar 74, which is an integral part of the push rod 72. At the lower portion of the push rod 72 is formed an annular indentation or groove 76 in the outer periphery of the push rod 72. The groove 76 also has a camming surface 78 at its lower end. A push rod spring 80 is then inserted over the push rod 72 from its lower end. The push rod 72 is then inserted into the top of the ball cage 58 and held in place by partially threading a tubularly shaped operating handle or disconnect button 82 onto the upper portion of the ball cage 58, as indicated by reference character 64. The disconnect button 82 has a a notch 84 and camming surfaces 86, which are similar to the previously described drive shaft notch 34 and the drive shaft camming surfaces 36 respectively. The purpose of the notch 84 is to provide a means by which a remote handling tool (not shown) can lift the disconnect button 82. At the upper end of the disconnect button 82 is formed an inwardly extending annular lip 88, against which the push rod collar 74 normally bears. The push rod 72 is then pressed into the ball cage 58 until the groove 76 in the push rod 72 can be seen through the openings 66 in the ball cage 58. A retaining member or ball 90 is then placed in each of the three openings 66 formed in the ball cage 58. An annular indent or notch 92 having upper and lower camming surfaces 94 and 96, respectively, is formed in the inner periphery of the drive shaft 14 at a point a short distance below the shaft notch 34 formed on the outer periphery or drive shaft 14. The annular opening 97 (FIG. 2), formed in the drive shaft 14 by the notch 92 and the camming surfaces 94 and 96, is large enough to receive a portion of each ball 90. A short distance below the notch 92 and at the inner periphery of the drive shaft are formed two countersunk, parallel openings 98, which extend substantially through the drive shaft 14 in a transverse direction to the longitudinal axis of the drive shaft 14 and have countersunk portions 100 facing in the same direction as shown in FIG. 3. While holding the push rod 72 depressed in the ball cage 58, the previously assembled components are inserted further into the drive shaft 14 until the groove 56 in the top spring retainer 54 is aligned with the two transverse openings 98 in the drive shaft 14. A lock pin 102 is then inserted in each of the transverse openings 98 so as to lock the top spring retainer 54 to the drive shaft 14. The push rod 72 is then released.

However, the push rod 72 will not move upon being released, because the balls 90 are located a short distance below the notch 92 and are contained partially within the radial openings 66 in the ball cage 58 and partially within the groove 76 in the push rod 72 thereby preventing relative motion between the push rod 72 and the ball cage 58. The disconnect button 82 is then threaded further onto the ball cage 58, until the ball cage 58 hangs up on the balls 90. This is caused by the fact that the ball cage 58 is being raised relative to the drive shaft 14 by threading the disconnect button 82 further onto the ball cage 58, while the bottom of the disconnect button 82 is simultaneously making contact with the top of the drive shaft 14. As the ball cage 58 is raised, a gap 104 is created between the top spring retainer 54 and the bottom of the ball cage 58. In addition, as the ball cage 58 is raised, it raises the balls 90 until they reach a position opposite the notch 92 in the drive shaft 14. At this point the push rod spring 80, which is still in a compressed position, acts against the collar 74 on the push rod 72 forcing the push rod in an upwardly direction. As the push rod 72 is forced upwardly, the camming surface 78 forces the balls 90 out of the groove 76 and into the notch 92 and thereby locks the ball cage 58 to the drive shaft 14. The balls 90 are then kept in this position by the lower portion of the push rod 72, which has a full diameter and has been raised opposite to the balls 90 by the push rod spring 80. The upward travel of the push rod 72 is then stopped by the collar 74 coming in contact with the lip 88 at the top of the push rod button 82. The disconnect button 82 is then backed off one-half turn, so as to lower the ball cage 58 a slight amount to permit the balls 90 to rest loosely in the notch 92 in the drive shaft 14 and the openings 66 in the ball cage 58. During the above procedure, the ball cage 58 is kept from turning by holding the lower end of the disconnect rod 44 by any suitably shaped tool. The disconnect button 82 is then locked to the ball cage 58 by transversely inserting a plurality of lock pins 106, with two such lock pins 106 being used in this example, through the lower portion of the disconnect button 82 and substantially through the wall of the ball cage 58.

LATCHING MECHANISM

A short distance above the bottom of the drive shaft 14 an annular shoulder 108 is formed at the inner periphery of the drive shaft 14 (FIG. 1C). A tubularly shaped lower spring retainer 110, a locking spring 112 and a locking button 114 are slidably inserted over the disconnect rod 44 from its lower end. The locking button 114 is tubular in shape and has its outer periphery rounded at its lower end, as indicated by reference character 115. A tubularly shaped release button 116 is threaded onto the lower portion of the disconnect rod 44, as indicated by reference character 118, until it makes contact with a shoulder 120 formed at the lower end of the disconnect rod 44. The release button 116 thus holds in place the three aforementioned parts previously inserted over the lower portion of the disconnect rod 44. The release button 116 is then locked in place by locking pin 122, which is inserted transversely through the release button 116 and in the disconnect rod 44.

Referring now particularly to FIGS. 1C and 4 of the drawings, the coupling unit 32 comprises a tubularly shaped thickened portion 124, a plurality of flexure members or arms 126, and a plurality of latching members or coupling fingers 128. The tubular portion 124 has external and internal threads, as indicated by reference characters 130 and 132 respectively. Annular upper and lower shoulders 134 and 135 respectively are also formed on the external periphery of the tubular portion 124. Integrally affixed to the bottom of the tubular portion 124 are the flexure arms 126, with this example of the invention having two such flexure arms 126. Each flexure arm 126 extends downwardly from the tubular portion 124 and has a relatively straight, ribbon-type form. The thickness of each flexure arm 126 is relatively thin in order to permit flexing of the flexure arm 126 with the juncture of each flexure arm 126 at the tubular portion 124 serving as a pivotal point for the flexing of each flexure arm 126, as indicated generally by reference character 136. To the bottom of each flexure arm 126 is integrally affixed a coupling finger 128. Each coupling finger 128 has the general shape of a tubular segment. On the outer periphery of each coupling finger 128 are formed a plurality of parallel annularly shaped teeth 138, which engage mating teeth 140 formed on each upper arm 142 of the control rod 10. On the inner periphery of the coupling finger 128 and opposite the toothed portion of the coupling finger 128 is formed an annular taper 144 against which the rounded portion 115 of the locking button 114 is forced by the locking spring 112. Insertion of of the coupling fingers 128 into the inner periphery of the control rod arms 142 is facilitated by chamfering the lower end of the coupling fingers 128, as indicated by the reference character 146. In this example of the invention, each coupling finger 128 engages two upper control rod arms 142, as shown in FIG. 4.

Associated with the coupling unit 32 is a coupling guide 148. The coupling guide 148 is generally cylindrical in shape and has a number of radial slots 150 formed therein, which extend longitudinally in the coupling guide 148 so that each slot 150 can receive its corresponding upper control rod arm 142. The slot 150 extends from the bottom of the coupling guide 148 to a point a short distance above the upper control rod arms 142, as indicated by reference character 152 (FIG. 1C). In this example of the invention, the slots 150 are formed at right angles to one another and correspond to the number of arms 142 of the control rod 10, with four slots 150 being provided in the coupling guide 148. The coupling guide 148 is adapted to engage the upper end of the control rod 10 by insertion of the upper control rod arms 142 thereof into the slots 150. This insertion is facilitated by chamfering the lower end of the coupling guide 148 at locations adjacent (not shown) the slots 150.

Prior to connecting the coupling unit 32 to the lower end of the drive shaft 14, the coupling guide 148 is threaded onto the tubular portion 124 of the coupling unit 32, until the guide contacts the lower shoulder 135 of the tubular portion 124. The coupling guide 148 is then backed off until it is aligned with the coupling unit 32, as shown in FIG. 4. An annular machined shim 154 is then installed so as to bear tightly against the upper shoulder 134 and the top surface of the coupling guide 148. A lock pin 156 is then transversely inserted through the coupling guide 148 and partially into the tubular portion 124, so as to maintain the proper alignment between the coupling guide 148 and the coupling unit 32.

DASHPOT

When the control rod 10 is scrammed in order to terminate quickly the chain reaction in the reactor core, the shock energy of the downward termination thereof is absorbed by a shock absorber or dashpot 30 (FIG. 1B). The dashpot 30 comprises an inverted cup member 158 rigidly secured to the drive shaft 14 in a manner to be described hereinafter, an opposing cup member 160 mounted for sliding movement along the length of the drive shaft 14, and a dashpot spring 162 which normally maintains the cups 158 and 160 in a spaced position. The inverted cup member 158 has a flange 164 formed at its upper end, which has a diameter which is less than the inside diameter of the shroud tube 12. The flange 164 creates a drag or decelerating force during the downward movement of the control rod 10, because of the opposition created by the downward movement of the flange 164 through the water surrounding it. The amount of drag created by the flange 164 is determined by the opening between the flange 164 and the shroud tube 12, since a larger gap permits a larger rate of water to escape from underneath the flange 164 and thus create less drag. The inverted cup member 158 also has at least one small radial opening 166 at its upper end to vent any gas entrapped within the dashpot 30. The opposing cup member 160 is tapered longitudinally, as indicated by reference character 168. The greater the overlap becomes between the cups 158 and 160, the smaller the gap between the two cups 158 and 160 becomes thus resulting in a lesser rate of water escaping from within the dashpot 30 through the aforementioned gap. This, therefore, provides a means of controlling the rate at which the water within the dashpot 30 can escape, which in turn controls the amount of drag produced by the water entrapped within the dashpot 30. The opposing cup member 160 also has a flange 172 formed at its lower end. The diameter of the flange 172 is sufficiently large, so that the flange 172 can make contact with the top of the inner portions of the dashpot stop 18.

A lock ring 174 and the inverted cup member 158 is threaded on the drive shaft 14, as indicated by reference character 176. The dashpot spring 162 and the opposing cup member 160 is then slidably inserted over the drive shaft 14. The dashpot spring 162 is then collapsed sufficiently to permit the threading of the coupling unit 32 with its associated coupling guide 148 onto the lower end of the drive shaft 14 (FIG. 1C), as indicated by reference character 132, until the coupling unit 32 comes in contact with a shoulder 178 formed on the drive shaft 14. The coupling unit 32 and the coupling guide 148 are then fixed to the drive shaft 14 by transversely inserting a plurality of lock pins 156 through the coupling guide 148, through the coupling unit 32 and partially into the drive shaft 14. The inverted cup member 158 is then turned on its threads so as to obtain the proper length of dashpot stroke between the cups 158 and 160. The inverted cup member 158 is then fixed to the drive shaft 14 by transversely inserting a plurality of lock pins 180 through the cup member 158 and into the drive shaft 14. The lock ring 174 is next threaded against the top of the inverted cup member 158 with a predetermined amount of torque. The lock ring 174 is then fixed to the drive shaft 14 by transversely inserting a lock pin 182 through the lock ring 174 and partially into the drive shaft 14. All lock pins, previously mentioned, are installed flush or slightly inside the outer surface of the outer member through which the lock pin has been inserted. All lock pins are then fixedly secured by any means well known in the art, such as by welding or by peening the circumference of the hole in which the lock pins were inserted.

OPERATION

Control rod unlatching

Starting with the control rod 10 fully inserted in the reactor core (not shown), the uncoupling of the control rod 10 from the drive shaft 14 will first be described, because the accompanying drawings show the relative position of all components with the control rod 10 in the fully inserted position. First the push rod 72 is fully depressed and held in that position against the opposing force of the push rod spring 80. This aligns the groove 76 in the push rod 72 with the radial openings 66 in the ball cage 58. The disconnect button 82 is then firmly grasped at the notch 84 and lifted. The upward movement of the disconnect button 82 causes the ball cage 58 to move in an upwardly direction, as the ball cage 58 is firmly fixed to the disconnect button 82 by the lock pins 106. The upward movement of the ball cage 58 forces the balls 90 against the upper camming surface 94 in the drive shaft 14, which forces the balls 90 into the groove 76 and out of the notch 92 in the drive shaft 14. This permits the ball cage 58 to move in an upwardly direction while the drive shaft 14 remains stationary. As soon as the balls 90 have been lifted above notch 92, the push rod 72 can be released. However, it is desirable to keep the push rod 72 depressed so as to permit the balls 90 to roll freely against the inner surface of the drive shaft 14 during their upward movement. If the push rod 72 is released, the push rod spring 80 will produce an upward force against the collar 74 and thereby produce an upward force by the camming surface 78 against the balls 90, thus forcing the balls 90 against the inner surface of the drive shaft 14. This will produce a greater frictional force during the upward movement of the balls 90, because the balls 90 are forced against the inner surface of the stationary drive shaft 14.

As the disconnect rod 44 is fixed to the ball cage 58 by the lock pin 70, the upward movement of the disconnect button 82 also causes the disconnect rod 44 to move in an upwardly direction. The disconnect rod 44 moves slidably upwardly through the top spring retainer 54, which is fixed to the drive shaft 14 by means of lock pins 102 and, therefore, remains in a stationary position. The upward movement of the disconnect rod 44 also causes the shoulder 46 on the disconnect rod 44 to act against the collar 50 and its related disconnect rod sleeve 48 thereby compressing the rod spring 52 against the stationary top spring retainer 54. The upward movement of the disconnect button 82 is then halted when the disconnect rod sleeve 48 comes in contact with the bottom of the stationary top spring retainer 54. The contact between the disconnect rod sleeve 48 and the top spring retainer 54 occurs before the balls 90 arrive at the top of the drive shaft 14. Otherwise, if the balls 90 were permitted to be raised above the drive shaft 14, the balls 90 would roll out of the radial openings 66 and fall on the outside of the drive shaft 14 and result in a possible loss of the balls 90 in the reactor core.

The upward movement of the disconnect rod 44 also raises the release button 116, which is fixed to the disconnect rod 44 by the lock pin 122. The disconnect rod 44 moves slidably through the locking button 114 until the release button 116 makes contact with the locking button 114. The further movement upward of the disconnect rod 44 then causes the release button 116 to force the locking button 114 in an upward direction. The disconnect rod 44 must be raised until the bottom of the release button 116 is a short distance above the top of the tapered portion 144 on the inner surface of the coupling fingers 128 to permit sufficient inward movement of the coupling fingers 128 in order to allow the complete disengagement of the teeth 138 on the coupling fingers 128 from the mating teeth 140 on the upper control arms 142. In addition, as the locking button 114 is raised, the locking button 114 compresses the locking spring 112 against the lower spring retainer 110, which is kept in a stationary position by the lower spring retainer 110 bearing against the shoulder 108 on the drive shaft 14.

After the release button 116 has been raised to its proper position as previously described, the drive shaft 14 is firmly grasped at the notch 34. The drive shaft 14 is then raised while simultaneously raising the disconnect button 82, so as to maintain the same relative position between the release button 116 and the coupling fingers 128. Lifting of the drive shaft 14 will also raise the coupling unit 32 and the coupling guide 148 as both are fixed to the drive shaft 14 by the lock pins 156. As the coupling unit 32 is raised, the teeth 138 and 140 will produce a camming action which will force the coupling fingers 128 inwardly, so as to uncouple completely the coupling fingers 128 from the upper control rod arms 142. Reliable uncoupling up to a friction coefficient of about 0.8 is assured by conservative selection of tooth angles. The inward movement of the coupling fingers 128 simultaneously causes the flexure arms 126 to flex inwardly from their pivotal point 136.

As soon as the coupling fingers 128 are raised above the top of the upper control arms 142, the disconnect button 82 can be released. Upon releasing the disconnect button 82, the previously compressed rod spring 52 acts against the collar 50. The collar 50 then acts against the disconnect rod shoulder 46 and forces the disconnect rod 44 in a downward direction until the disconnect button 82, which is fixed to the disconnect rod 44 through the ball cage 58, comes in contact with the drive shaft 14. Simultaneously, the previously compressed locking spring 112 acts against the locking button 114 and forces the latter in a downward direction, until the locking button 114 makes contact with the tapered portion 144 on the coupling fingers 128 thereby urging the coupling fingers in an outward direction. Further removal of the drive shaft 14 and all related components can now be accomplished by merely lifting the drive shaft 14 by use of a remote handling tool (not shown) in conjunction with the notch 34.

As the drive shaft 14 is raised, it slidably passes through the opposing cup member 160 and simultaneously raises the inverted cup member 158, which is fixed to the drive shaft 14 by lock pins 180, until there is only a slight overlap between the cups 158 and 160. At this point, the coupling unit 32 comes in contact with the bottom of the opposing cup member 160 and begins to raise the cup member 160 with any additional upward movement of the drive shaft 14, so as to maintain a constant overlap between the cups 158 and 160.

The drive shaft 14 can also be raised by merely lifting the disconnect button 82 without having to grasp and lift separately the drive shaft 14 at the notch 34. This can be accomplished by raising the disconnect button 82, as previously described. In this alternate method, however, the disconnect button 82 is raised until the disconnect rod sleeve 48 comes in contact with the top spring retainer 54, which is fixed to the drive shaft 14 as previously described. As the disconnect button 82 and the disconnect rod 44 are lifted further, the disconnect rod 44 continues to bear against the disconnect rod sleeve 48 through the disconnect rod shoulder 46. The disconnect rod sleeve 48 then lifts the top spring retainer 54 which in turn lifts the drive shaft 14, as the top spring retainer 54 is fixed to the drive shaft 14 as previously described. In this manner, the disconnect button 82 can be used to raise the drive shaft 14 and all related components.

CONTROL ROD LATCHING

To couple the drive shaft 14 to the control rod 10, the drive shaft 14 is lowered until the bottom of the coupling unit 32 comes in contact with the top of the upper control rod arms 142. The drive shaft 14 is then rotated until the upper control rod arms 142 become aligned with their associated slots 150 in the coupling guide 148. The drive shaft 14 is then lowered until the coupling unit 32 comes in contact with the teeth 140 on the control rod arms 142. The locking button 114 is then raised in the same manner as previously described. The drive shaft 14, with the locking button 114 in its raised position, is then lowered until the coupling unit 32 fully engages the upper control rod arms 142 in a similar manner as previously described for the unlatching of the coupling unit 32 from the upper control rod arms 142. The coupling unit 32 is prevented from being lowered too far as the bottom of the coupling unit 32 will be stopped in its downward movement by the top of the cruciform control rod 10, as indicated by reference character 184. However, the coupling unit 32 can be lowered until it makes contact with the top surface 184 of the control rod 10. At this point the disconnect button 82 can be released so as to permit the locking button 114 to bear against the tapered portion 144 on the coupling fingers 128. At this point the tips of the teeth 138 and 140 are opposite each other. Therefore, a slight upward movement of the drive shaft 14 causes the teeth 138 and 140 to become properly engaged, as the locking button 114 bearing against the coupling fingers 128 forces the teeth 138 and 140 to become properly engaged with the aid of the camming action produced by the faces of the teeth 138 and 140. Even with friction coefficients among the teeth 138 and 140 as low as 0.2 in certain applications of the invention, unlatching of the control rod is prevented by the force of locking spring 112 against the locking button 114 which forces the coupling fingers 128 against the upper control rod arms 142.

DASHPOT COMPRESSION

Upon the gravitational descent of the control rod 10, the drive shaft 14, and associated mechanism, the opposing cup member 160 is stopped in its downward descent when the cup 160 contacts the upper end of the dashpot stop 18. Although the opposing cup member 160 is stopped, the inverted cup member 158 continues its downward descent over the cup 160. As the cup 158 does so, the control rod 10 is decelerated by the compression of the dashpot spring 162, the previously described drag produced by the flange 164 on the cup 158, and the previously described controlled escape of the water within the dashpot 30. A gap 170 is maintained between the lower end of the inverted cup member 158 and the flange 172 on the opposing cup member 160 by the bottom of the control rod 10 coming in contact with a control rod positioner (not shown) located at the bottom of the reactor vessel. The control rod 10 contacts the positioner near the end of the downward travel of the control rod 10. The aforementioned control rod positioner (not shown), therefore, prevents the lower end of the inverted cup member 158 from striking the flange 172 on the opposing cup member 160.

It is, therefore, apparent that there has been disclosed a locking mechanism 28 built into the disconnect button 82. The locking mechanism 28 comprises a push rod 72, operated by a push rod spring 80, and the balls 90. The disconnect button 82 is firmly locked to the drive shaft 14, when the balls 90 are forced into the notch 92 in the drive shaft 14. Unlatching of the coupling unit 32 from the control rod 10 requires a depression of the push rod 72 and then the lifting of the disconnect button 82 while simultaneously holding the push rod 72 in a depressed position. Therefore, the control rod 10 cannot be inadvertently uncoupled from the drive shaft 14.

From the foregoing, it will be apparent that a novel and positive locking mechanism has been disclosed. The locking mechanism of the invention, although described herein in connection with a control rod driving mechanism associated with a nuclear reactor, obviously can be adapted for use in other locking applications and in particular in those applications requiring a locking device remotely situated from the actual point of coupling.

While there has been shown and described what is at present considered to be the preferred embodiment of the invention, modifications thereto will readily occur to those skilled in the art. It is not desired, therefore, that the invention be limited to the specific arrangements shown and described.

What is claimed as new is:

1. A releasable locking mechanism comprising a pair of substantially aligned longitudinally extending members, coupling means formed on the adjacent inner ends of said members for releasably coupling said members together at said adjacent ends, one of said members being annular and having an intermediate member movably extending therethrough which is operative to position said coupling means in a locked relationship with the other of said members at an inner position of said intermediate member, said intermediate member being movable to an outer position to unlock said coupling means from said other member, and releasable locking means mounted at the outer end portion of said one member and having a portion thereof exposed to the outer end of said one member for manual accessibility and preventing outward movement of said intermediate member relative to said one member.

2. The combination of claim 1 wherein said locking means is resiliently biased for preventing outward movement of said intermediate member when in its inner position.

3. A releasable locking mechanism comprising a pair of substantially aligned longitudinally extending members, means at the adjacent inner end portions of said members for releasably engaging said members together, one of said members being tubular and having an intermediate member movably extending therethrough which is operative to lock said coupling means in a coupled position at an inner position and to permit release at an outer position, lock means movably mounted at the outer end portion of said intermediate member and having a portion thereof exposed to the outer end of said intermediate member for manual accessibility and so as to prevent outward movement of said intermediate member relative to said tubular member at one position and to release said intermediate member when moved to another position.

4. The combination of claim 3 wherein said lock means is movable in a direction other than the release movement of said coupling lock member.

5. The combination of claim 1 wherein said one member is a reactor control rod drive shaft, said other member is a reactor control rod, said intermediate member is a disconnect rod having an enlarged portion at its outer end which engages the drive shaft so as to limit the inward movement of said rod, and including spring biased means for urging said rod in an inwardly direction.

6. The combination of claim 5 wherein said drive shaft has at least one latching member, said reactor control rod has at least one catch member coupled to said latch member, and said disconnect rod extends coaxially through said drive shaft.

7. A locking mechanism comprising, in combination, a pair of substantially aligned longitudinally extending members, means for releasably coupling said members together at their adjacent ends, one of said members being tubular and having a coupling lock member movably extending therethrough, said lock member being movable to an inner position to lock said coupling means and to an outer position to permit release of said coupling means, lock means slidably mounted and substantially within the outer end portion of said lock member for preventing outward movement of said coupling lock member relative to said tubular member at an outer position of the lock means and to release said coupling lock member when said lock means is moved to an inner position.

8. A releasable locking mechanism comprising a first tubular member, a second member substantially longitudinally in alignment with said first member and releasably coupled to one end of said first member, an intermediate member extending longitudinally through said first member, means at the inner end of said intermediate member for preventing uncoupling of said first member from said second member, a tubular portion formed at the outer end of said intermediate member, said tubular portion having a side opening and a lock element movably mounted therein, a lock operating member slidably mounted in said tubular portion and having a cam portion engageable with the lock element to move it outwardly through said side opening when the lock operating member is moved to an outer position, said first member having a recess portion engageable by the lock element when said lock operating member is at an outer position so as to prevent any longitudinal movement of said intermediate member relative to said first member, and said means for preventing uncoupling of said first and second members being longitudinally movable toward the other end of said first member so as to permit uncoupling of said first and second members only when said lock element is disengaged from the recess portion of said first member by inward movement of the lock operating member.

9. The combination of claim 8 wherein said first member is accessible only from its outer end, said intermediate member is biased relative to said first member toward the inner end of said first member, said tubular portion has an inwardly extending lip at its outer end, and said lock operating member is biased against said lip.

10. The combination of claim 8 including a retainer slidably positioned over said intermediate member and secured to said first member inwardly of said tubular portion when said tubular portion is locked to said first member, said intermediate member having a shoulder inwardly of said retainer, a sleeve slidably positioned over said intermediate member between said retainer and said shoulder and movable a predetermined distance before engaging both said retainer and said shoulder.

11. A releasable locking mechanism comprising a tubular member having an indent on the inner surface thereof, a sleeve longitudinally slidable in said member, said sleeve having at least one opening in the wall thereof and being movable into alignment of said opening with said indent, a tubular operating handle having its one end secured to one end of said sleeve and having said one end shaped to abut against the adjacent end of said member, said handle being biased against said member by a spring contained within said member, an inwardly extending lip formed at the other end of said operating handle, a ball disposed in said opening having a diameter greater than the thickness of said wall, a rod longitudinally slidable in said sleeve and said operating handle, said rod having one end projecting through said other end of said handle to form an operating extension, a collar secured near the one end of said rod and disposed within said operating handle, said collar being movable to a position of engagement with said lip, means contained within said handle between said collar and said sleeve for biasing said collar against said lip, said rod having a circumferential indentation near the other end of said rod for receiving said ball to provide for retraction of said ball out of engagement with said indent when said rod is moved against said bias to juxtapose said rod indentation with said indent, a circumferential camming surface formed in said rod adjacent said rod indentation, said camming surface being engageable with said ball to project said ball into said indent, and said rod having a longitudinally straight portion which is operative to engage said ball when said ball extends into said indent and said sleeve to lock said sleeve to said member.

References Cited

UNITED STATES PATENTS

| | | | |
|---|---|---|---|
| 3,068,737 | 12/1962 | Mewse | 85—5 |
| 2,370,083 | 4/1945 | Brewster | 85—5 |
| 2,939,739 | 6/1960 | Grunsky | 254—29 X |
| 3,012,811 | 12/1961 | Sandrock | 294—83 |
| 3,107,209 | 10/1963 | Frisch | 294—95 X |
| 3,117,484 | 1/1964 | Meyers | 85—5 |

FOREIGN PATENTS

| | | |
|---|---|---|
| 957,177 | 5/1964 | Great Britain. |
| 1,241,050 | 8/1960 | France. |
| 855,275 | 11/1960 | Great Britain. |

CARL W. TOMLIN, Primary Eaminer

A. KUNDRAT, Assistant Examiner